(12) United States Patent
Wakao

(10) Patent No.: US 10,633,242 B2
(45) Date of Patent: Apr. 28, 2020

(54) FUEL SUPPLY STRUCTURE FOR FILLER PIPE

(71) Applicant: HONDA MOTOR CO., LTD., Tokyo (JP)

(72) Inventor: Masaki Wakao, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 193 days.

(21) Appl. No.: 15/626,683

(22) Filed: Jun. 19, 2017

(65) Prior Publication Data

US 2017/0362074 A1    Dec. 21, 2017

(30) Foreign Application Priority Data

Jun. 21, 2016 (JP) .................................. 2016-122663

(51) Int. Cl.
*B67D 7/04* (2010.01)
*B67D 7/54* (2010.01)
(Continued)

(52) U.S. Cl.
CPC .............. *B67D 7/048* (2013.01); *B60K 15/00* (2013.01); *B60K 15/04* (2013.01); *B67D 7/54* (2013.01);
(Continued)

(58) Field of Classification Search
CPC .......... B67D 7/048; B67D 7/54; B60K 15/00; B60K 15/04; B60K 2015/0461;
(Continued)

(56) References Cited

U.S. PATENT DOCUMENTS 4,715,509 A * 12/1987 Ito ........................ B60K 15/04
141/59
4,966,299 A * 10/1990 Teets ...................... B60K 15/04
123/516

(Continued)

FOREIGN PATENT DOCUMENTS

| CN | 102036847 A | 4/2011 |
| JP | 2015-71408 A | 4/2015 |
| JP | 2017-149342 A | 8/2017 |

OTHER PUBLICATIONS

Japanese Office Action with English Translation dated Mar. 27, 2018, 6 pages.

(Continued)

*Primary Examiner* — Timothy L Maust
(74) *Attorney, Agent, or Firm* — Rankin, Hill & Clark LLP

(57) ABSTRACT

Disclosed is a fuel supply structure for a filler pipe including the hollow circular cylindrical part having the fuel filler port and the connection opening, the first flap mechanism which is disposed on a side of the fuel filler port of the hollow circular cylindrical part and opens the fuel filler port in response to press by a nozzle, the drain through hole for communication between the inside and the outside of the hollow circular cylindrical part, and the drain hole shutting valve for open and shutting the drain through hole. The drain hole shutting valve is provided with the opening/shutter mechanism including the valve member for shutting the drain through hole in response to an opening operation of the first shutter member.

5 Claims, 4 Drawing Sheets

(51) Int. Cl.
 *B60K 15/04* (2006.01)
 *B60K 15/00* (2006.01)
 *F16K 1/20* (2006.01)

(52) U.S. Cl.
 CPC .... *B60K 2015/0461* (2013.01); *F16K 1/2007* (2013.01)

(58) Field of Classification Search
 CPC ........ B60K 15/035; B60K 2015/03538; B60K 2015/03552; F16K 1/2007
 See application file for complete search history.

(56) References Cited

U.S. PATENT DOCUMENTS

| | | | | |
|---|---|---|---|---|
| 5,186,220 A | * | 2/1993 | Scharrer | B60K 15/03519 137/39 |
| 5,465,861 A | * | 11/1995 | Kunz | B60K 15/04 141/312 |
| 6,105,612 A | * | 8/2000 | Schaar | B60K 15/035 123/519 |
| 6,415,827 B1 | * | 7/2002 | Harris | B60K 15/03519 141/302 |
| 9,487,083 B2 | * | 11/2016 | Kito | B60K 15/04 |
| 2002/0189691 A1 | * | 12/2002 | Morinaga | B60K 15/03519 137/588 |
| 2011/0108563 A1 | | 5/2011 | Gerdes | |
| 2014/0319161 A1 | * | 10/2014 | Kito | B60K 15/04 220/820 |
| 2015/0083720 A1 | | 3/2015 | Kobayashi et al. | |

OTHER PUBLICATIONS

Chinese Office Action received in corresponding CN application No. 201710467460.9 dated Jan. 9, 2020 with English translation (12 pages).

* cited by examiner

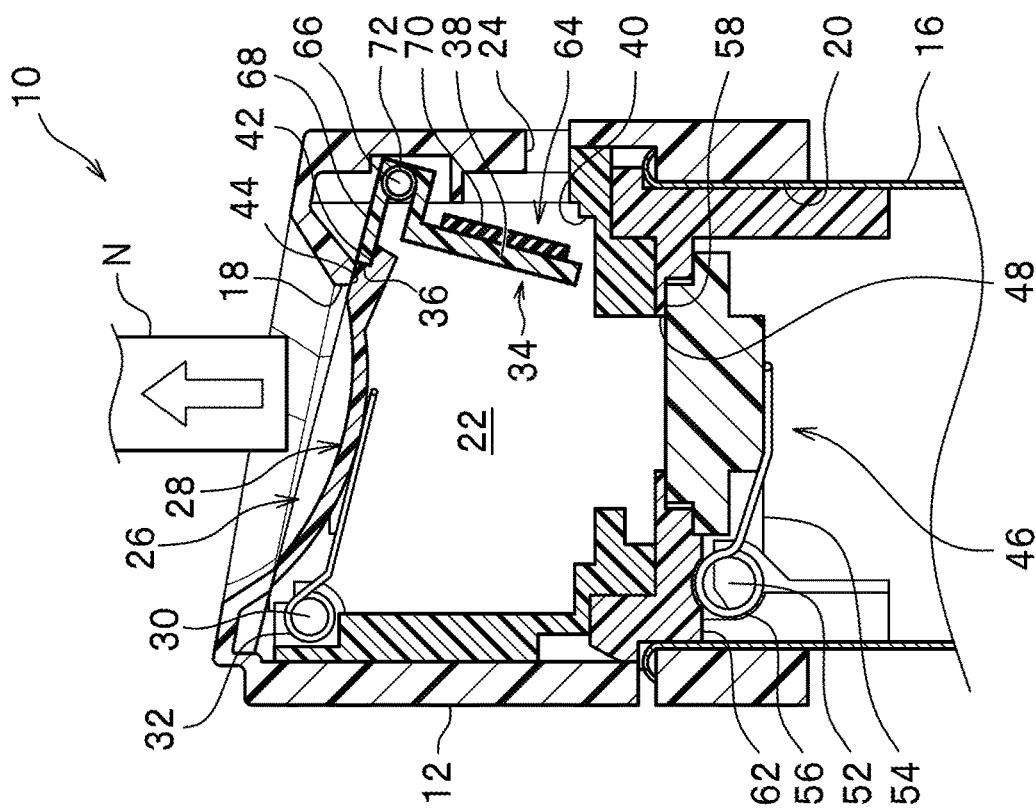

Comparative Example

Comparative Example

FUEL SUPPLY STRUCTURE FOR FILLER PIPE

CROSS REFERENCE TO RELATED APPLICATION

This application claims the foreign priority benefit under Title 35, United States Code, § 119(a)-(d) of Japanese Patent Application No. 2016-122663, filed on Jun. 21, 2016 in the Japan Patent Office, the disclosure of which is herein incorporated by reference in its entirety.

BACKGROUND OF THE INVENTION

1. Field of the Invention

The present invention relates to a fuel supply structure for a filler pipe.

2. Description of the Related Art

A vehicle with an internal combustion engine includes a fuel supply tube for communication between a fuel filler port into which a fueling gun is inserted and a fuel tank for storing. In recent years, a so-called cap-less type fueling structure has been adopted to improve convenience upon refueling fuel by omitting the fuel cap conventionally provided on a fuel filler opening.

For example, JP2015-71408 A disclosed a cap-less type of fuel supply structure in which the structure includes an outside cover having a cylindrical shape. A drain hole is formed in the outside cover to discharge water, dust, etc which have entered an internal space of the outside cover.

SUMMARY OF THE INVENTION

An aspect of the present invention provides a fuel supply structure of a filler pipe capable of suppressing decrease in a sucking efficiency of the volatile fuel during fueling though a drain hole is provided.

An aspect of the present invention provides a fuel supply structure of a filler pipe, comprising:

a hollow cylindrical part including an opening into which a nozzle of a fueling gun is inserted and a connection opening connected to the filler pipe for supplying fuel to a fuel tank;

a flap mechanism which normally shuts the opening and opens the opening when the flap mechanism receives a pressure by the inserted fueling gun;

a drain through hole in the hollow cylindrical part which provides communication between the inside and the outside of the hollow circular cylindrical part; and a drain hole shutting valve which opens and shuts the drain through hole in response to an opening operation of the flap mechanism.

According to the present invention, when the volatile fuel is sucked during fueling, a drain hole is closed by an opening/shutting mechanism cooperative with opening/shutting operation of the flap mechanism. As a result, in the present invention, though the drain hole is provided, it is possible to suppress decrease in the sucking efficient of the volatile fuel during fueling.

Further, the flap mechanism may include a first energizing part which generates a first energizing force to bring the state of the flap mechanism in a closed state, the fuel supply structure further comprising:

a second energizing part which generates a second energizing force to bring the drain hole in a closed state, wherein the second energizing force is smaller than the first energizing force.

According to the present invention, in the normal state other than the fueling operation, the drain hole shutting valve brought into the opening state and the drain through hole is opened. In the present invention, it is possible to discharge water, dust, etc having entered into the inside through the drain through hole in normal state.

Another flap mechanism may be disposed on a side of the connection opening and include a shutter member which shuts the connection opening when receiving the pressure by the inserted fueling gun.

According to the present invention, another flap member is disposed on a side of the connection opening, which surely stop entrance of dusts, etc into the filler pipe.

An aspect of the present invention provides the fuel supply structure capable of suppressing decrease in the sucking efficiency of the volatile fuel upon fueling even though the drain through hole is provided.

BRIEF DESCRIPTION OF THE DRAWINGS

FIGS. 2A and 2B are partially enlarged cross section views showing an operation of an opening/shutting mechanism shown in FIG. 1.

DETAILED DESCRIPTION OF THE INVENTION

Conventionally, there may be a case where a fueling device in a gas station may be provided with a suction mechanism to suck a volatile liquid fuel at the same time as fueling to suppress emission of the volatile fuel in the ambient air during fueling.

When fueling is carried out with the fueling device including this suction mechanism, there may be decrease in a sucking efficiency of the volatile liquid fuel because the ambient air is also sucked from a drain through hole communicated with an outside through a drain whole.

Figure 1:
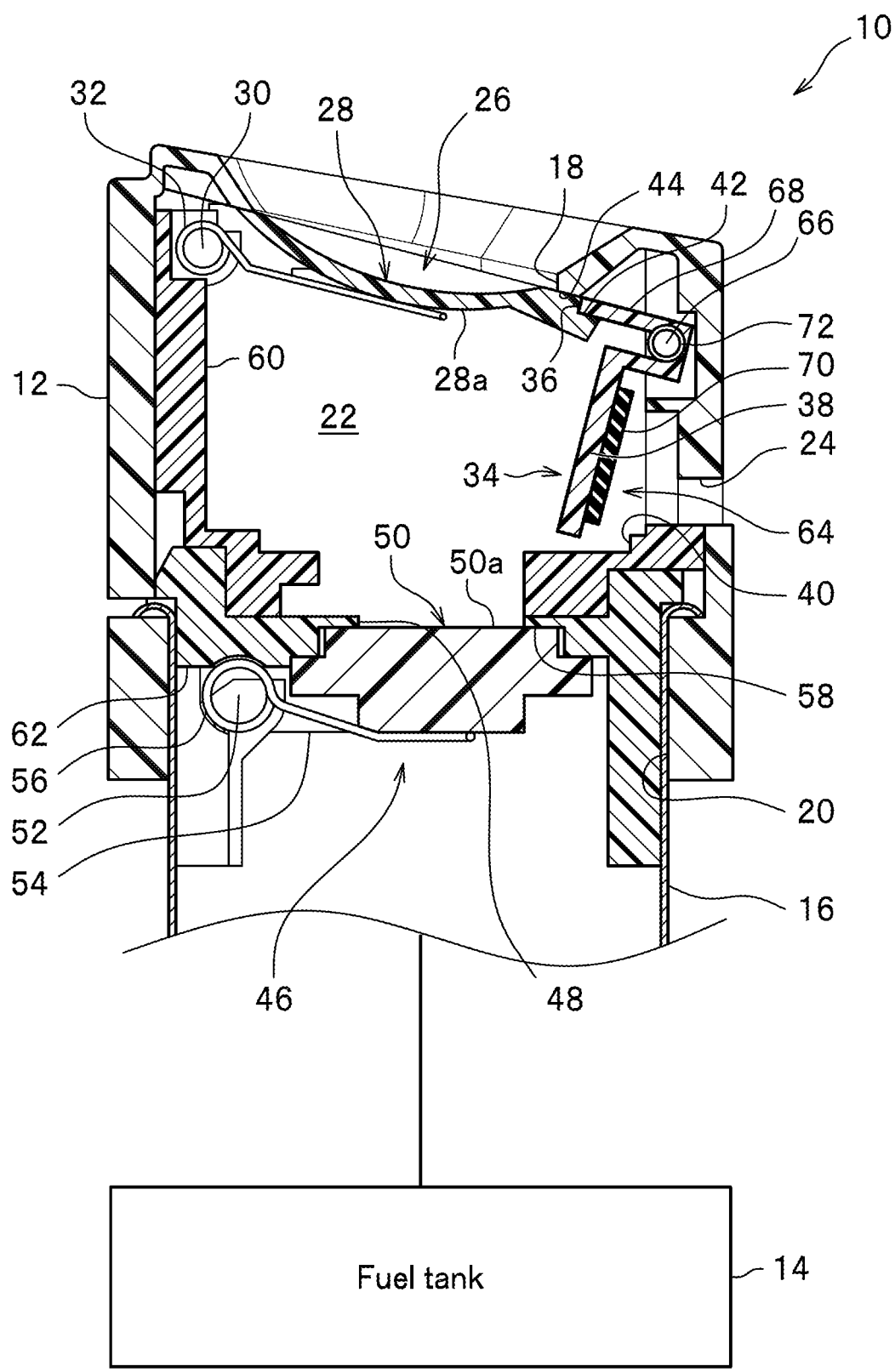
FIG. 1 partially enlarged cross section view showing a fuel supply structure according an embodiment of the present invention.

An embodiment is described below, referring to drawings. FIG. 1 is a partially enlarged cross section view showing a fuel supply structure according to the embodiment of the present invention.

A fuel supply device (not shown) is provided at a predetermined part of a vehicle. The fuel supply device includes a lid (not shown) having a substantially disk plate and a hinge (not shown) for pivoting a lid for opening and shutting. The lid keeps a shutting state of the lid with a locking mechanism and becomes an unlocked state by a release lever provided in a vehicle cabin, so that the shutting state is changed into an opening state as a result of a predetermined rotation of the lid on a rotation center of the hinge.

As shown in FIG. 1, a fuel supply stricture 10 according to the embodiment of the present invention is applied to a fuel supply part (not shown) and includes a hollow circular cylindrical part (a tube) 12, a filler pipe 16 for supplying to a fuel tank 14 fuel supplied from the hollow circular cylindrical part 12. The hollow circular cylindrical part 12 includes a fuel filler port (opening) 18 into which a nozzle N (see FIGS. 2A and 2B) of a fueling gun (not shown) is inserted, a connection opening 20 to which the filler pipe 16 is connected, the filler pipe 16 supplying the fuel to the fuel tank 14.

Between the fuel filler port 18 and the connection opening 20 at ends in the axial direction of the hollow circular cylindrical part 12, an internal space 22 is provided for communication between the fuel filler port 18 and the connection opening 20. At an intermediate part of the hollow circular cylindrical part 12, a drain through hole 24 is formed for communication between the internal space 22 and the outside of the hollow circular cylindrical part 12. The drain through hole 24 penetrates, for example a wall of the hollow circular cylindrical part 12 is for draining water, dust, etc. having entered the internal space 22 of the hollow circular cylindrical part 12.

On a side of the fuel filler port 18 of the hollow circular cylindrical part 12, a first flap mechanism (flap mechanism) 26 is disposed. The first flap mechanism 26 is for opening and shuttering the fuel filler port 18 upon a fueling operation. For example, as described later, when the nozzle N is inserted into the fuel filler port 18, a first shutter member 28 is pushed by a tip of the nozzle N, so that the fuel filler port 18 is opened.

The first flap mechanism 26 includes the first shutter member 28 for opening and shutting the fuel filler port 18 of the hollow circular cylindrical part 12, a first hinge 30 having a pivoting axis of the first shutter member 28, a first spring (first energizing mechanism) 32 attached to the first hinge 30 to energize the first shutter member 28 to close the first shutter member 28. The first flap mechanism 26 is normally closed except when fuelling. The first shutter member 28 has an engaging hollow part 42 at a tip thereof (an end of the first shutter member 28 at an opening side end). The engaging hollow part 42 abuts and pushes an engaging part 36 of a opening/shutter mechanism 34 (described later) in such a direction that a valve member 38 of the opening/shutter mechanism 34 is separated from a seating part 40.

The first shutter member 28 includes a shutter body 28a curved to have a substantially arc shape in cross section and can pivot on the first hinge 30 disposed on one side of the shutter body 28a which is opposite to the opening side end. The pivoting operation of the first shutter member 28 switches the first flap mechanism 26 between a closed state in which the fuel filler port 18 is closed as a result that the shutter body 28a abuts a first seating part 44 to shut the fuel filler port 18 and an open state in which the shutter body 28a is separated from the first seating part 44.

A connection opening hollow circular cylindrical part 12 includes on a side of the connection opening 20 a second flap mechanism (another flap mechanism) 46. The second flap mechanism 46 is for opening and shutting an opening 48 on a side of the connection opening 20 upon the fueling operation. For example, as described later, when the nozzle N is inserted from the fuel filler port 18, the opening 48 on the side of the connection opening 20 is opened by pushing by the tip of the nozzle N (see FIG. 3B). The second flap mechanism 46 is disposed on the side of the connection opening 20 of the hollow circular cylindrical part 12. This prevents for dusts from entering the filler pipe 16 and the fuel tank 14.

The second flap mechanism 46 includes a second shutter member 50 for opening and shutting the opening 48 on the side of the connection opening 20, a second hinge 52 having a pivoting axis of the second shutter member 50, an arm part 54 connecting the second shutter member 50 to the second hinge 52, and a second spring 56 engaged with the second hinge 52 for energizing the second shutter member 50 to be in a closed state.

The second shutter member 50 includes a shutter body 50a having an annular step and can pivot on the second hinge 52 disposed on a one side of the shutter body 50a. The pivoting operation of the second shutter member 50 switches the second flap mechanism 46 between a closed state in which the opening 48 on a side of the connection opening 20 is closed as a result that the second shutter member 50 abuts the second seating part 58 provided at a lower part of a circumferential part of the opening 48 to shut the fuel filler port 18 and an open state in which the second shutter member 50 is separated from the second seating part 58. The second shutter member 50, i.e., the second flap mechanism 46, is normally closed except when fuelling.

Between the fuel filler port 18 and the connection opening 20 of the hollow circular cylindrical part 12, a first inner hollow cylindrical member 60 is fit and inserted into an inner wall of the hollow circular cylindrical part 12. The first inner hollow cylindrical member 60 has a function of forming the seating part 40 of the opening/shutter mechanism 34 described later, a supporting function of supporting the pivoting shaft of the first shutter member 28, and a supporting function of supporting the pivoting shaft for the opening/shutter mechanism 34 together.

Between the connection opening 20 of the hollow circular cylindrical part 12 and the drain through hole 24, a second inner hollow cylindrical member 62 is disposed to be fit and inserted into the inner wall of the hollow circular cylindrical part 12. In the second inner hollow cylindrical member 62, the opening 48 on a side of the connection opening 20 and a second seating part 58 are formed. In addition, the filler pipe 16 is pinched by the hollow circular cylindrical part 12 and the second inner hollow cylindrical member 62. The second inner hollow cylindrical member 62 has a connecting function of connecting the filler pipe 16 to the connection opening 20 and a supporting function of supporting the pivoting shaft of the second flap mechanism 46.

Between the fuel filler port 18 and the drain through hole 24, a drain hole shutting valve 64 is disposed for opening and shutting the drain through hole 24. The drain hole shutting valve 64 includes the opening/shutter mechanism 34 for shutting the drain through hole 24 in response to the opening operation of the first shutter member 28 of the first flap mechanism 26.

The opening/shutter mechanism 34 includes the valve member 38 which is bent in a letter shape of "L" in cross section and provided pivotable on a pivoting shaft 66, a link part 68 which extends substantially orthogonal with the valve member 38 and pivots together with the valve member 38, and a seal member 70 made of rubber or plastic adhered or fixed to a wall surface of the valve member 38.

Further, the opening/shutter mechanism 34 includes the seating part 40 on which the valve member 38 seats, the seating part 40 being formed in the first inner hollow cylindrical member 60, the engaging part 36 engaging with the engaging hollow part 42 of the first shutter member 28 disposed at a tip of the link part 68, and a return spring (second energizing member) 72 for energizing the opening/shutter mechanism 34 in such a direction that the valve member 38 seats on the seating part 40.

The return spring 72 has a spring force which is smaller than that of the first spring 32 of the first flap mechanism 26 at the engaging part 36. In the normal state other than the fueling operation, a return spring 72 energizes the drain hole shutting valve 64 in such a direction that the drain hole shutting valve 64 becomes in a closed state (the drain through hole 24 is closed).

Operation of the fuel supply structure 10 configured as described above is described below. FIGS. 2A and 2B are partially enlarged cross section views showing the operation of the opening/shutter mechanism 34 shown in FIG. 1. The operation of the opening/shutter mechanism 34 is described below in detail.

As shown in FIG. 1, when the first shutter member 28 of the first flap mechanism 26 is in a closed state, a spring force (energizing force) of the first spring 32 in the first flap mechanism 26 is applied to the first shutter member 28 in such a direction that the first shutter member 28 seats on the first seating part 44. Simultaneously, the spring force (energizing force) of the first spring 32 exceeds the spring force (energizing force) of the return spring 72 at the engaging part 36, and the exceeding force is applied to the drain hole shutting valve 64 in an opening state through engagement between the engaging hollow part 42 and the engaging part 36.

In a normal state other than a fueling state, the spring force by the first spring 32 exceeds the spring force by the return spring 72 at the engaging part 36, the exceeding force separates the valve member 38 from the seating part 40, which holds a communication state between the inside and the outside of the hollow circular cylindrical part 12 through the drain through hole 24.

In the embodiment of the present invention, in the normal state other than the fueling state, the drain through hole 24 can be opened as a result of the open state of the drain hole shutting valve 64. As a result, in the normal state, it is possible to discharge water and dust, etc having entered the internal space 22 through the drain through hole 24 communicated with the outside.

When the nozzle N of the fueling gun is inserted into the fuel filler port 18, the tip of the nozzle N presses the first shutter member 28 in a lower direction. As shown in FIG. 2A, the first shutter member 28 pivots on a shaft of the first hinge 30 by a predetermined angle against the spring force by the first spring 32. The first shutter member 28 is separated from the first seating part 44, so that the first flap mechanism 26 is brought in the open state in which the fuel filler port 18 is opened. This release the engagement between the engaging hollow part 42 of the first shutter member 28 and the engaging part 36 of the opening/shutter mechanism 34 and the valve member 38 seats on the seating part 40, which brings the drain through hole 24 in the closed state (see FIG. 2A).

As shown in FIG. 2B, when the nozzle N is pulled from the fuel filler port 18 after completion of the fueling operation, the first shutter member 28 returns to the original position by seating on the first seating part 44 by the spring force of the first spring 32. The engaging hollow part 42 of the first shutter member 28 abuts the engaging part 36, which causes the valve member 38 and the link part 68 of the opening/shutter mechanism 34 to pivot on the pivoting shaft 66 clockwise, so that the valve member 38 is separated from the seating part 40, the drain through hole 24 becoming in the open state.

Next, an operation when fueling is performed using a fueling device with a sucking mechanism for sucking vaporized fuel to return the sucked vapor within the tank in the gas station at the same time as the fueling, is described below.

Figure 3A:
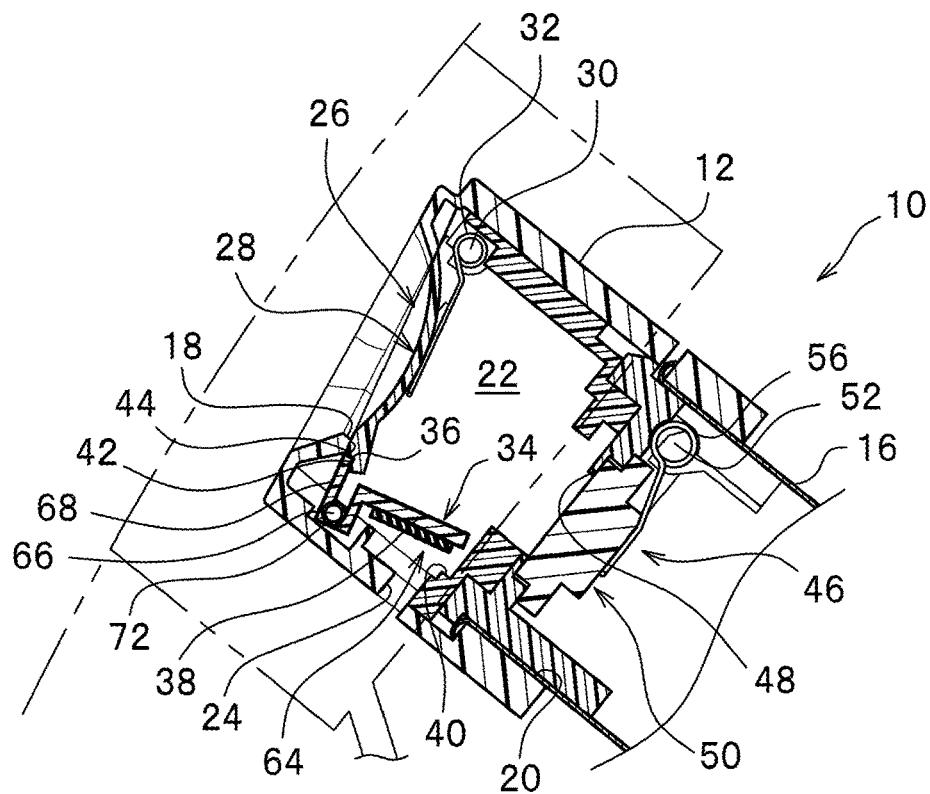
FIGS. 3A and 3B are cross section views showing a state in which sucking are made by a sucking mechanism during fueling.
Figure 3B:
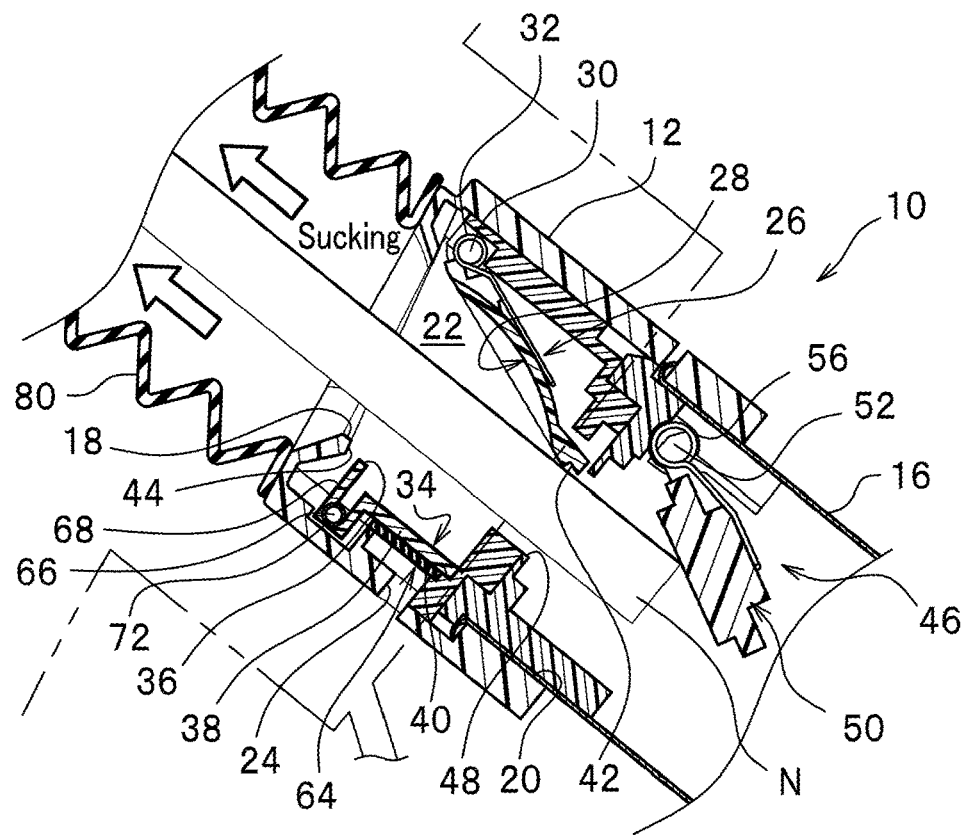
Figure 4A:
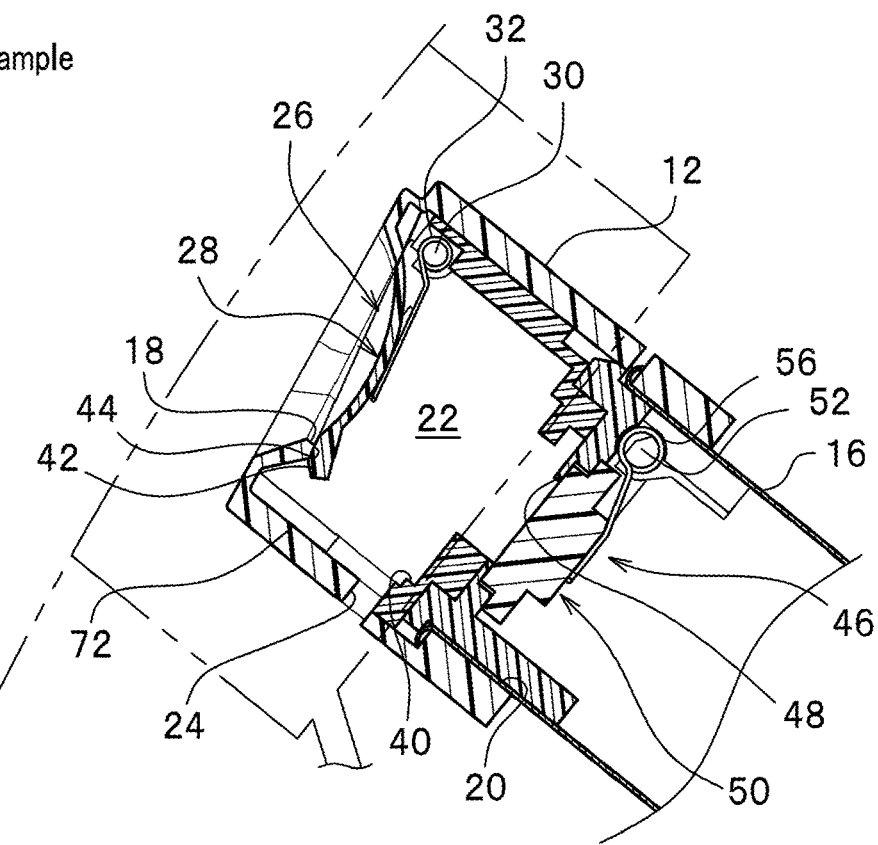
FIG. 4A is a cross section view showing a state before fueling in a comparative example which the inventor considered and FIG. 4B is a cross section view of the comparative example showing a state in which suction is made by a sucking mechanism during fueling.
Figure 4B:
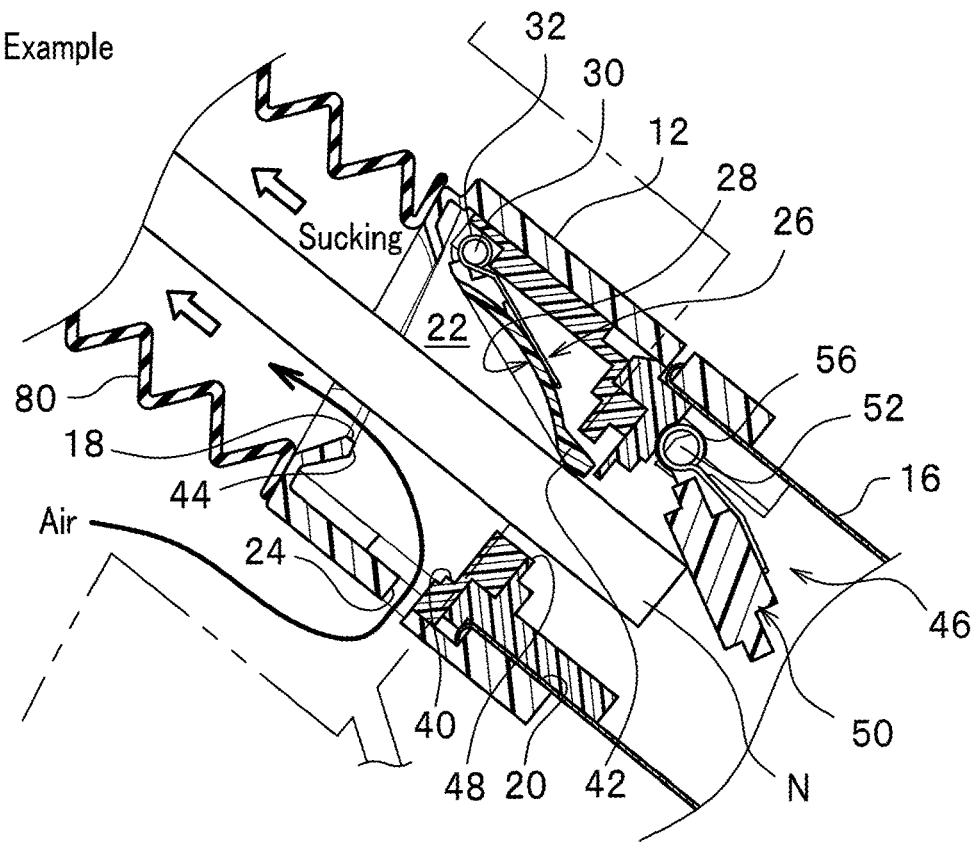

FIGS. 3A and 3B are cross section views showing states in which sucking is performed by a sucking mechanism during fueling. FIG. 4A is a cross section view showing a state before fueling in a comparative example which the inventor considered and FIG. 4B is a cross section view showing a state in which suction is performed by a sucking mechanism during fueling in the comparative example. In FIGS. 3B and 4B, a reference 80 denotes bellows made of rubber covering the nozzle N.

The comparative example considered by the inventor have the same configuration except that the drain hole shutting valve 64 (including the opening/shutter mechanism 34) described in the embodiment is omitted. Accordingly, the same components as those in the embodiment are designated with the same references as those in the embodiment of the present invention, and a detailed description is omitted.

In the comparative example, a sucking efficient of the volatile liquid fuel may decrease because the ambient air is sucked from the drain through hole 24 communicating with the outside when fuel filling is made with the fuel filling device having a sucking mechanism for sucking the volatized fuel and the air through the drain hole 24 communicating with the outside (see blank arrow in FIG. 4B).

On the other hand, according to the embodiment, as shown in FIG. 3A, in the normal state other than the fueling operation, the drain through hole 24 is opened. However, in the fueling operation, the opening/shutter mechanism 34 of the drain hole shutting valve 64 operates and the drain through hole 24 is in the closed state in which the valve member 38 seats on the seating part 40 (see FIG. 3B).

As a result, according to the embodiment of the present invention, when fueling is performed with a fueling device having a sucking mechanism for sucking volatile fuel at the same time as fueling is performed, it is possible to preferably avoid decrease in the sucking efficiency of the volatized fuel in the fueling operation. As a result, a sucking amount of the volatized fuel in the fueling operation is larger than that in the comparative example.

The invention claimed is:

1. A fuel supply structure of a filler pipe, comprising:
   a hollow cylindrical part including an opening into which a nozzle of a fueling gun is inserted and a connection opening connected to the filler pipe for supplying fuel to a fuel tank;
   a flap mechanism which normally shuts the opening and opens the opening when the flap mechanism receives a pressure by the inserted fueling gun;
   a drain through hole in the hollow cylindrical part which provides communication between an inside of the hollow cylindrical part and an external air;
   a drain hole shutting valve which shuts the drain through hole in response to an opening operation of the flap mechanism;
   a first energizing part which generates a first energizing force to bring a state of the flap mechanism in a closed state; and
   a second energizing part which generates a second energizing force on the drain hole shutting valve to bring the drain through hole in a closed state,
   wherein the second energizing force is smaller than the first energizing force,
   wherein the flap mechanism includes a shutter member including an engaging part engageable to a shutter mechanism, and wherein when the shutter member of the flap mechanism is in a closed state, the first energizing force is applied to the drain hole shutting valve in such a direction that the drain hole shutting valve is brought into an opening state through the shutter member and the engaging part.

2. The fuel supply structure as claimed in claim 1, further comprising another flap mechanism which is disposed on a side of the connection opening and normally shuts another opening on the side of the connection opening and opens the another opening on the side of the connection opening when the another flap mechanism receives the pressure by the inserted fueling gun.

3. The fuel supply structure as claimed in claim 1, wherein the drain hole shutting valve is installed in the hollow cylindrical part, and wherein the drain hole shutting valve includes a shutter mechanism which shuts the drain through hole in response to the opening operation of the flap mechanism.

4. The fuel supply structure as claimed in claim 3, further comprising another flap mechanism which is disposed on a side of the connection opening and normally shuts another opening on the side of the connection opening and opens the another opening on the side of the connection opening when the another flap mechanism receives the pressure by the inserted fueling gun.

5. A fuel supply structure of a filler pipe, comprising:
   a hollow cylindrical part including an opening into which a nozzle of a fueling gun is inserted and a connection opening defined by the filler pipe for supplying fuel to a fuel tank;
   a flap mechanism which normally shuts the opening and opens the opening when the flap mechanism receives a pressure by the inserted fueling gun;
   another flap mechanism which is disposed on a side of the connection opening and normally shuts another opening on the side of the connection opening and opens the another opening on the side of the connection opening when the another flap mechanism receives the pressure by the inserted fueling gun;
   a drain through hole in the hollow cylindrical part between the flap mechanism and the another flap mechanism, the drain through hole providing communication between an inside of the hollow cylindrical part and an external air;
   a drain hole shutting valve installed between the flap mechanism and the another flap mechanism, the drain hole shutting valve shutting the drain through hole in response to an opening operation of the another flap mechanism;
   a first energizing part which generates a first energizing force to bring a state of the flap mechanism in a closed state, and
   a second energizing part which generates a second energizing force on the drain hole shutting valve to bring the drain through hole in a closed state, wherein the second energizing force is smaller than the first energizing force,
   wherein the flap mechanism includes a shutter member including an engaging part engageable to a shutter mechanism,
   wherein when the shutter member of the flap mechanism is in a closed state, the first energizing force is applied to the drain hole shutting valve in such a direction that the drain hole shutting valve is brought into an opening state through the shutter member and the engaging part.

* * * * *